United States Patent [19]

Georges

[11] 4,439,720
[45] Mar. 27, 1984

[54] UNITS FOR GENERATING CONSTANT-FREQUENCY ALTERNATING ELECTRIC ENERGY WITH SUBSTITUTE DRIVING MEANS

[75] Inventor: Jean-Claude Georges, Boulogne, France

[73] Assignee: Societe Aman, Bezons, France

[21] Appl. No.: 227,782

[22] Filed: Jan. 23, 1981

[51] Int. Cl.³ .................... H02K 7/02; H02K 7/18; H02P 15/00
[52] U.S. Cl. .................................. 322/4; 322/9; 322/32; 322/40; 290/4 R
[58] Field of Search ............... 322/4, 29, 32, 40–42, 322/9; 290/4 R, 4 D, 30 A

[56] References Cited

U.S. PATENT DOCUMENTS

| | | | |
|---|---|---|---|
| 2,749,491 | 6/1956 | Stinger | 322/41 X |
| 3,187,250 | 6/1965 | Born et al. | 322/40 X |
| 3,477,013 | 11/1969 | Smith | 322/4 |
| 3,558,901 | 1/1971 | Jacobus | 322/4 X |
| 3,609,426 | 9/1971 | Gaul | 322/4 |
| 3,675,112 | 7/1972 | Smith | 322/4 |

Primary Examiner—R. J. Hickey

[57] ABSTRACT

An electrical alternator system is capable of being driven by either of two prime movers and of being automatically transferred therebetween without substantial variation in the electrical output of the alternator. A planetary gear system having two mechanical drive inputs and one output is interposed between the normally used prime mover and an alternator. One mechanical input to the planetary gear system is provided with a controlled variable speed input $N_R$ from the prime mover which is controlled so as to compensate for speed variations in the other mechanically input $N_E$ from the prime mover thus maintaining the output speed $N_S$ substantially equal to a desired reference speed $N_O$. If the first prime mover should loose its power for some reason, then a transition occurs during which a second prime mover is coupled to the rotor of the first prime mover with the compensating second input to the planetary gear system being automatically changed so as to still provide a substantially constant speed drive to the alternator. A fly wheel is preferably also incorporated in the drive train so as to store energy during normal operations for use during such transition period.

12 Claims, 3 Drawing Figures

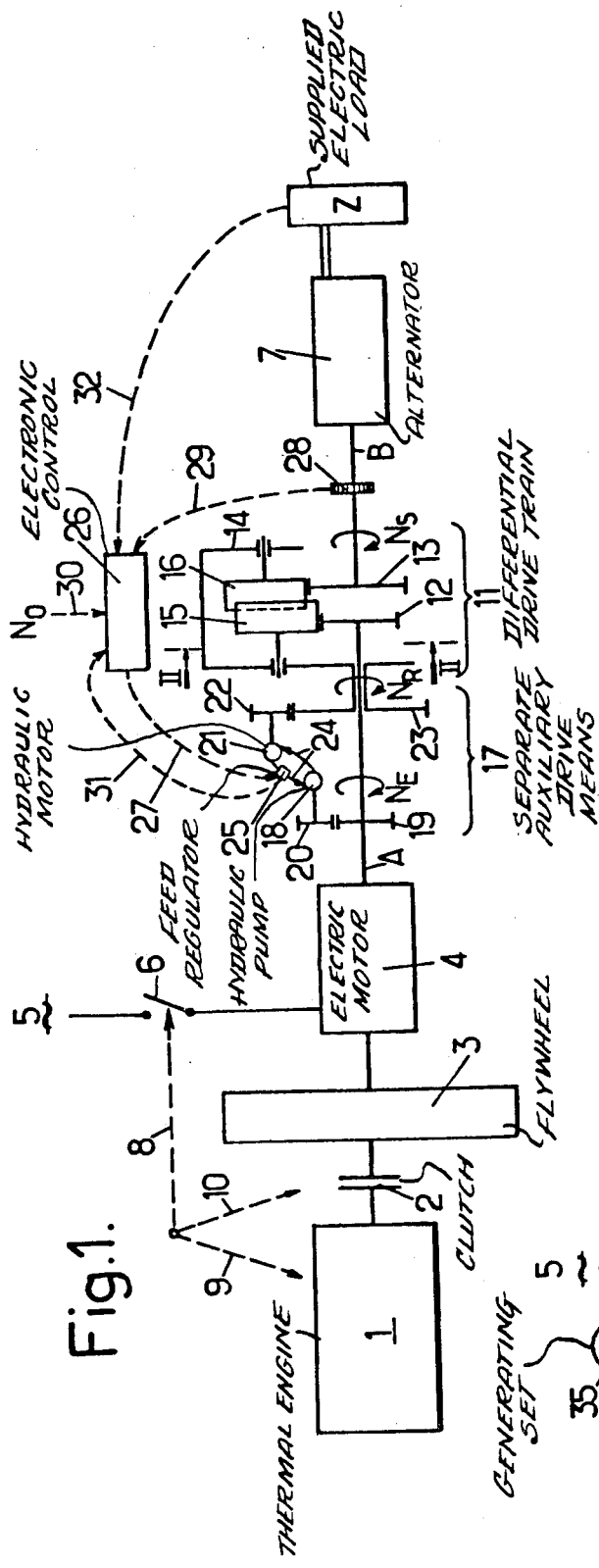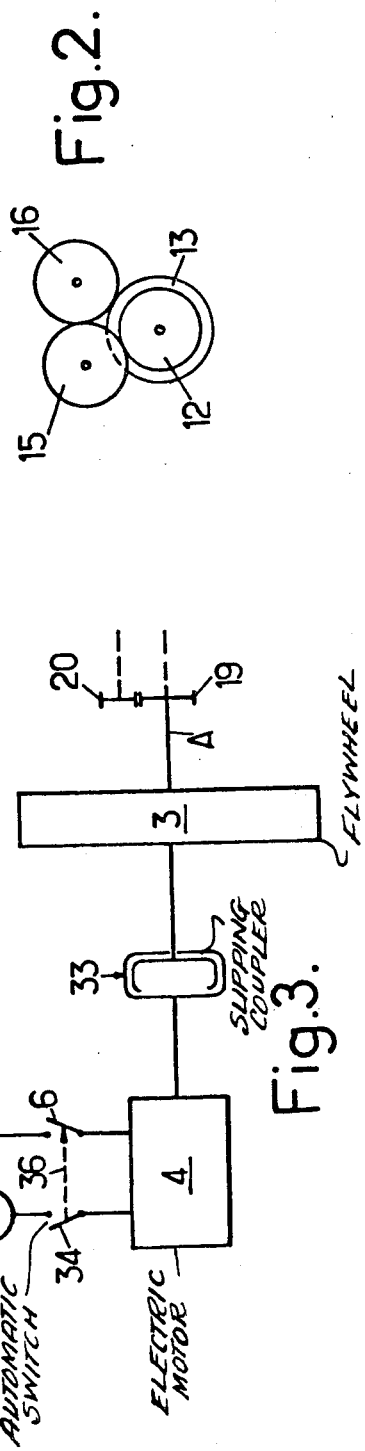

UNITS FOR GENERATING CONSTANT-FREQUENCY ALTERNATING ELECTRIC ENERGY WITH SUBSTITUTE DRIVING MEANS

This invention relates to alternator units or "sets" for generating constant-frequency alternating electric energy without interruption in output electrical power, as is required for supplying certain electric equipment such as computers, data processors, telecommunication systems, navigation systems, radar, test platforms, etc. It relates more particularly to emergency or alternate drive mechanisms for such units which are automatically activated in the event the normal driving power is interrupted. Such units may comprise an alternator, means normally supplied by a utility electrical distribution network for driving this alternator, relay or emergency driving means for taking over from the network to drive the alternator if there is an interruption in power supplied by the network, said means such as an inertia flywheel, an emergency thermal engine, a clutch or coupler, and correction means compensating for the small and brief variations in the speed of the flywheel at times when the drive is beginning to be taken over by the relay means.

The invention relates more particularly to the correction means for such units which may comprise a differential drive train and a regulation system adapted to act automatically during transfers of the energy source on the rotational speed of a rotary regulating element of the drive train so as to maintain the speed of the alternator shaft substantially constant and equal to a reference value.

The correction means of this invention provides a substantial improvement in practical requirements in that an alternator embodying it is independent of any auxiliary DC source, more reliable, more economical and consumes less energy than those known heretofore, while at the same time being no more cumbersome or less accurate in regulation than those known heretofore.

One exemplary embodiment of the invention includes a differential drive train placed between the shaft A of a flywheel and the shaft B of an alternator, this train comprising a first gearwheel integral with shaft A, a second gearwheel integral with shaft B and an assembly, comprising the speed regulating or correction element, adapted to additively transmit rotational power from the first gearwheel to the second with a ratio which varies—and preferably increases—with the rotational speed of said regulating element, and in that the regulating system is driven by shaft A.

Preferred embodiments may also include one or more of the following arrangements:

1. The regulating system may include a variable-delivery displacement hydraulic pump driven by shaft A, a constant capacity hydraulic motor adapted to drive the regulating element, a closed hydraulic circuit adapted to transmit fully to this motor the volume of hydraulic liquid delivered by the pump and conversely, and means for determining the flow rate of the hydraulic liquid in this circuit depending on the speed $N_S$ of the shaft of the alternator and on the reference value $N_O$ so as to maintain $N_S$ substantially equal to $N_O$.
2. The regulating system may include an electric generator driven by shaft A, an electric motor adapted to drive the regulating element, this generator and this motor being mounted so as to operate in Ward Leonard fashion, and an electric circuit adapted to act on the voltage of the generator as a function of the speed $N_S$ of the shaft of the alternator and of the reference value $N_O$ so as to give to the speed of the motor a value to substantially maintain equality between $N_S$ and $N_O$.
3. The assembly may be arranged so that, when the rotational speed $N_R$ of the regulating element is zero, the speed $N_E$ of the flywheel has its maximum value slightly greater than $N_O$ (e.g. particularly by about 3%) and that, when $N_R$ reaches a relatively low maximum value, preferably of the order of about a hundred revolutions per minute, $N_E$ reaches its minimum value lower than the reference value $N_O$ (e.g. particularly by about 10%).
4. The assembly may include a cage loosely mounted on shaft A and/or shaft B, which cage constitutes the above-reference regulating element and which itself carries third and fourth gearwheels meshing with one another and, respectively, the third with the first and the fourth with the second.
5. In an assembly in accordance with the preceding paragraph, the third and fourth gearwheels carried by the cage may all have the same number of teeth as the first gearwheel, and this number of teeth may be less than that of the second gearwheel.
6. In an assembly according to the preceding paragraph, the numbers of teeth of the first and second gearwheels may be respectively 30 and 31.
7. Means may be provided for detecting variations in the electric power consumed by the load supplied by the aternator independently of the speed $N_S$ and for making the control means sensitive to these power variations.
8. The means for driving the alternator may be formed by an electric motor whose rotor is integral with the flywheel.
9. The means for driving the alternator may be formed by an electric motor whose rotor is connected to the flywheel through a slipping coupler.
10. The means for driving the alternator may be formed by the utility electric network itself.

The invention comprises, apart from these principal arrangements, certain other arrangements which are used preferably at the same time and which will be more explicitly discussed hereafter.

In what follows, presently preferred embodiments of the invention will be described in a non-limiting way with reference to the accompanying drawings, of which:

FIG. 1 is a schematic diagram of an electrical supply unit equipped with emergency drive means in accordance with the invention;

FIG. 2 is a schematic view along II—II of FIG. 1 of a part of this unit; and

FIG. 3 is a schematic diagram of a part of an alternate embodiment of an electrical supply unit also improved in accordance with the invention.

The exemplary electrical supply unit of FIG. 1 comprises a succession of the following devices:

a thermal engine 1, (a rotary drive means) generally of the Diesel type, a clutch 2, a heavy inertia flywheel 3, an electric motor 4, (a rotary drive means) generally of the asynchronous type, supplied by conventional utility mains or network 5 through a cutout switch 6, and an alternator 7 driven by motor 4 and adapted to supply with alternating electric energy an electric load Z.

The electrical load Z is of a type requiring permanent supply at constant frequency F, i.e. regulated generally to within at least 1% and without a power interruption—even if there is an interuption in the power supplied by the utility network 5. This is often the case, for example, with automatic information processing systems, in which a power interruption, even through brief, may lead to serious disturbances.

In normal operation (i.e. when the utility network 5 supplies power), motor 4 is supplied by this network and driven at a substantially constant speed (for example close to 1500 revs/minute, except for slipping which is of the order of 1 to 2%). Flywheel 3 is also driven by this motor 4. Clutch 2 is open and engine 1 is stopped in the ready condition (pre-heated).

When a power interruption occurs in the network 5, cutout 6 is automatically triggered by conventional means, which is symbolized by arrow 8, and motor 4 is no longer supplied. This detected power interruption from network 5 also causes immediate start-up of thermal engine 1 (arrow 9) then, very shortly afterwards, for example after 1 to 2 seconds, closing of clutch 2 (arrow 10). The energy previously stored by flywheel 3 is then applied to engine 1 to assist in speeding it up within a few seconds and, after such speeding up, it is this thermal engine 1 which thereafter drives the whole of the unit at the desired initial speed.

During this change over to emergency power source operation, the rotational speed of flywheel 3 (which is also that of the shaft of motor 4) is typically reduced by perhaps 10 to 15% in 3 or 4 seconds, then rises again to its initial value within a period of the order of 15 to 20 seconds. Such a temporary reduction of speed corresponds to an equivalent reduction in frequency F, which is undesirable.

Some solutions have already been proposed for remedying this disadvantage, such particularly as those described in French Pat. No. 2,070,297 filed on Nov. 20, 1969 in the name of the assignee. The present invention provides another solution to the same problem.

As depicted in FIG. 1, the two shafts A and B of motor 4 and of alternator 7 respectively are coaxial, but separate, and there is placed between these two shafts a differential drive train 11. This differential drive train comprises:

a first input gearwheel 12 coupled to shaft A and driven at the speed $N_E$ of this shaft, a second output gearwheel 13 coupled to shaft B and driven at the speed $N_S$ of this shaft, and a mobile assembly comprising a rotary regulating element, whose rotation speed $N_R$ is adjustable from outside, i.e. independently of speeds $N_E$ and $N_S$, and which is adapted to modify the ratio between these two speeds $N_E$ and $N_S$.

The arrangement depicted in FIG. 1 may be described as including a planetary gear system having two mechanical drive inputs (gear 12 and gear 22) and one output (gear 13). A controlled variable speed input $N_R$ is provided via gear 22 to compensate for speed variations in the other input $N_E$ thus maintaining the output speed $N_S$ substantially equal to a desired reference speed $N_O$.

External drive means driven by shaft A is adapted to maintain speed $N_R$ at a value which causes the speed $N_S$ to remain equal to a desired reference value $N_O$—in spite of the previously discussed variations in the speed $N_E$. The differential drive train 11 above is advantageously provided so as to fulfill the following two conditions:

for a speed $N_E$ greater than $N_O$ (for example by about 3%), the value of speed $N_R$ is zero, so as to, on the one hand, take into account a possible slight overspeed of the thermal engine (which may appear during transitory operating conditions when this engine is driving), and on the other hand so as to provide better stability of the regulation: in fact, said zero value of $N_R$ will never be observed in practice, so that the regulation will always be effected "on a gradient", i.e. within a range of values of $N_R$ which are nonzero and always in the same direction;

when during transfer of driving modes, as discussed above speed $N_E$ diminishes to its minimum value (which may be less than $N_S$ by about 10%), value $N_R$ increases up to a relatively low maximum (for example of the order of 100 revs/minute).

Thus, under cruising operating conditions, i.e. outside periods of driving mode transfers, speed $N_E$ is in general within a range of ±2% about speed $N_O$ and (taking into account the nature of the driving engine), speed $N_R$ remains very low, i.e. on the order of a few revs/minute.

In the preferred embodiment, the mobile assembly of train 11 comprises a cage 14 rotatably mounted on one at least of shafts A and B. The cage comprises two cylindrical gearwheels with axes parallel to the axes of shafts A and B—i.e. a third gearwheel 15 meshing with gearwheel 12 and a fourth gearwheel 16 meshing with gearwheel 15 and with gearwheel 13, these gearwheels 12 and 13 being then also cylindrical gearwheels. It is this cage 14 which forms the correction or regulating element for the drive train 11 and which is rotated at speed $N_R$.

In the illustrated embodiment, gearwheels 12, 15 and 16 have the same number of teeth and gearwheel 13 has a slightly greater number of teeth, these two numbers being, for example, respectively 30 and 31, or 33 and 34, or 34 and 35, or 50 and 51. A different distribution between the numbers of teeth could be also provided, gearwheel 12 having, for example, a number of teeth greater than that of gearwheel 13 and gearwheel 15, a number of teeth less than that of gearwheel 16.

A separate auxiliary drive means 17 is actuated by shaft A and adapted to drive cage 14 at speed $N_R$. It is preferably formed by an hydraulic unit comprising:

a variable-delivery displacement hydraulic pump 18, driven by shaft A through a pair of gearwheels 19, 20;

a constant capacity hydraulic motor 21, adapted to drive cage 14 through a pair of gearwheels 22, 23;

a closed liquid circuit 24, adapted to transmit fully to motor 21 the liquid delivered by pump 18 and conversely; and a feed regulating member 25, adapted to regulate the flow of liquid in circuit 24, for example by modification of the capacity of the hydraulic pump.

The feed regulator 25 is adjusted automatically so as to maintain the rotational speed $N_S$ of shaft B equal to the desired reference value $N_O$, (for example within at least 1%). Recourse is had for this purpose to an electronic control unit 26 capable of issuing electrical control instructions (symbolized by arrow 27) depending both on the real rotational speed $N_S$ of shaft B (which speed is detected by a tachymetric means 28 as (symbolized by arrow 29) and on a strictly stabilized reference frequency (in terms of value $N_O$, the introduction of this reference into unit 26 is symbolized by arrow 30). The value of this reference may itself be ajusted in any desirable way, particularly by manual or motorized control means. Feedback means symbolized by arrow 31 are also provided for transmitting to unit 26 information about the controlled condition of feed regulator 25 at any moment.

It is also advantageous to provide other conventional means (symbolized by arrow 32), for transmitting to unit 26 information about the electric power delivered at any moment by the alternator 7. In fact, if a load complement is coupled to the electric circuit fed by this alternator, or if on the contrary this circuit is subjected to load shedding, the rotational speed of the alternator tends to diminish or increase. By transmitting information about the modification of power drawn due to this coupling modification instantaneously to unit 26 a shorter response time of the control chain is obtained than if the information relative to this coupling modification was simply detected at the level of the variation in speed of the tachymetric member 28, i.e. at the level of the consequence and not at that of the cause.

Yet other means may be provided, depending on the needs of the installation, to act on unit 26. Thus, if several generating sets of the kind described above are to be operated in parallel to drive respectively identical alternators, a common electronic control unit 26 may be adopted for controlling their respective feed regulators 25 and, in such a case, this unit may also process information relative to the loads supplied respectively by the different generating sets so as to better distribute these loads between the generating sets.

The operation of the above-described exemplary generating set of FIGS. 1 and 2 is as follows. It will be assumed, in what follows, purely by way of illustration, that it is desired to drive alternator 7 at a rotational speed $N_O$ equal to 1500 revs/minute to within less than 1% variations therefrom, this alternator being for example intended to deliver alternating electric energy with a frequency F equal to 50 Hz.

In normal operation, motor 4 is supplied by the utility network and its rotor rotates at a speed $N_E$ slightly less than $N_O$, for example of the order of 1460 revs/minute. The speed $N_R$ of cage 14 is then low and the rotation of shaft A is transmitted to shaft B through gearwheels 12, 15, 16 and 13. Speed $N_S$ is then equal to $N_O$.

If, from this situation, utility network 5 is cut off, the cutout switch 6 operates, and as mentioned above, driving of the rotor of electric motor 4 is progressively taken over by the thermal engine 1. During this transition, speed $N_E$ begins to decrease for 3 to 4 seconds, to a minimum of about 1350 revs/minute (first phase), then rises again progressively to its initial value within 15 to 20 seconds (second phase).

During the first phase, speed $N_S$ tends to decrease also, but the instantaneous comparison between this speed, taken at 28, 29 and the reference speed $N_O$ generates an error signal acting immediately on feed regulator 25, in a direction and with an amplitude such that cage 14 is driven at a regulating speed $N_R$ capable of compensating for said error. During the first phase considered, this speed $N_R$ increases up to its maximum value which is of the order of 100 revs/minute. Then, during the second phase, in which speed $N_E$ again increases, the amount of compensation required for maintaining speed $N_S$ constant diminishes automatically, as does speed $N_R$, until speed $N_E$ has reached its stabilized reference value, the thermal engine 1 having then taken over completely from electric motor 4 for driving the generating set. Thus, electrical supply for load Z has then been ensured without a power cut (even though a power cut in the utility network has occurred) and without a modification of frequency during the whole of the transfer of the driving mode of shaft A.

Subsequent restoration of the electric supply for motor 4 by the network does not present a special problem: as soon as this restoration takes place, clutch 2 is opened and the rotor of motor 4 is again driven instantaneously electrically, without any modification of the speed $N_E$ of its shaft.

Although the hydraulic means proposed above for driving cage 14 from shaft A are preferred, this drive may be provided by different means. For example a generator-motor electric unit of the Ward Leonard type may be provided whereupon the hydraulic pump 18, hydraulic motor 21, hydraulic circuit 24 and feed regulator 25 of the preceding solution are then replaced respectively by an electric generator, an electric motor, an electric circuit and a rheostat or equivalent adjusting member.

It should also be noted that the assemblies described above between shafts A and B, may be applied without departing from the scope of the invention to driving an emergency generating set formed otherwise than according to FIG. 1. The only conditions to be fulfilled for this generating set are:

that it comprises means for normally driving shaft A through the utility network, an inertia flywheel, a thermal engine capable of taking over from the above means in case of a power cut in the network, and a clutch or coupler for transferring the drive mode of shaft A (network or thermal engine), and that the speed $N_E$ of shaft A only diminishes by a small fraction, generally less than 15%, for a relatively short period, generally less than 30 seconds, during changes in the drive mode of this shaft.

Thus, by way of example, there is illustrated in FIG. 3 another embodiment for such a set. This set comprises again a flywheel 3 integral with shaft A and an electric motor 4, particularly of the asynchronous type, normally fed by network 5 through cutout 6. Motor 4 is connected to the flywheel through a slipping coupler 33 (e.g. hydraulic) no thermal engine is coupled to the rotor of this motor 4 by means of a clutch. Rather, the thermal engine is here a generating set 35 and the electric supply for motor 4 is taken over from network 5 by another electric supply provided by said generating set 35 through a switch 34 which closes automatically when cutout 6 opens and conversely (arrow 36). The slipping of coupler 33 makes possible rapid acceleration of asynchronous motor 4 up to its nominal working conditions during start-ups, even before flywheel 3 has reached its normal cruising speed. In this variation, temporary slowing of shaft A during a change in the drive mode of this shaft is due to the time required for running up of generating set 35 from rest, which is generally on the order of ten seconds or so.

According to another variation, motor 4 of the preceding embodiments is omitted and, in normal operation, alternator 7 is driven by utility network 5 and itself drives the inertia flywheel 3, through train 11 and correction unit 17, whereas in case of a power cut in the network, driving of the alternator is taken over by the flywheel, then by a thermal engine coupled in this case to the flywheel.

Thus, in accordance with several exemplary embodiments, there is finally obtained an electric energy supply set equipped with emergency means in the case of a power cut in the utility network. Such a generating set has numerous advantages with respect to those known heretofore, particularly insofar as the independence is concerned with respect to any auxiliary DC source, reliability, low price, compactness and the possibility of using for alternator 7 and motor 4 (if use is made thereof) conventional non-modified models.

As should be evident, the invention is in no way limited to particular modes of application and exemplary embodiments which have been specially considered above. It embraces, on the contrary, all variations thereof, particularly those where the cylindrical gearwheels 12 and 13 of the above-described embodiment are replaced by two bevel gears, the cylindrical gearwheels 15 and 16 then being themselves replaced by a single satellite bevel gear meshing with the other two, the axis of this latter gearwheel sloping by an angle close to 90° with respect to shafts A and B and being mounted closely on a cage of the type of the above cage 14.

I claim:

1. An electrical alternator system capable of automatic transfer from being driven by one rotary drive means to being driven by another rotary drive means without substantial variation in the electrical output of the alternator, said system comprising:
    an alternator;
    a first rotary drive means having a first rotor element adapted to be rotationally driven by a first power source;
    a differential drive train means having a first mechanical drive input connected to be driven by said first rotor element and a mechanical drive output connected to drive said alternator;
    said differential drive train also having a second mechanical drive input through which additional mechanical energy can be combined with that coupled through the first input to said output;
    auxiliary drive means connected to be driven by said first rotor element and to transfer a variable controlled amount of additional mechanical energy therefrom to said second input of the differential drive train means;
    a flywheel mechanically coupled to said first rotor element;
    a second rotary drive means having a second rotor element adapted to be rotationally driven by a second power source; and
    coupling means for automatically coupling said second rotor element to said first rotor element in the event said first power source is interrupted.

2. Apparatus according to claim 1, characterized in that the auxiliary drive means comprises:
    a variable-delivery displacement hydraulic pump driven by the flywheel,
    a constant-displacement hydraulic motor circuit adapted to transmit to said motor the volume of liquid delivered by said pump and conversely, and
    means for determining the flow rate of liquid in said circuit as a function of the alternator shaft speed $N_S$ and a desired reference speed $N_O$ so as to maintain $N_S$ equal to $N_O$.

3. Apparatus in accordance with claim 1, characterized in that the auxiliary drive system comprises:
    an electric generator driven by the flywheel,
    an electric motor adapted to drive the second mechanical drive input,
    said generator and electric motor being mounted so as to operate in Ward Leonard fashion, and
    an electric circuit adapted to act on the voltage of the generator as a function of the alternator shaft speed $N_S$ and a desired reference speed $N_O$ so as to maintain the speed of the motor at a value such that equality is maintained between $N_S$ and $N_O$.

4. Apparatus according to claim 1, wherein said auxiliary drive means, said differential drive train and said coupling means is arranged so that, when the rotational speed $N_R$ input at said second mechanical drive input is zero, the flywheel shaft speed $N_E$ has its maximum value slightly greater than a desired reference speed $N_O$ by about 3%, and that, when $N_R$ reaches a relatively low maximum value on the order of approximately a hundred revolutions per minute, $N_E$ reaches its minimum value less than $N_O$ by about 10%.

5. Apparatus according to claim 1, wherein said differential drive train means comprises a cage rotationally mounted on at least one of the flywheel shaft and the alternator shaft, said cage itself carrying a third and fourth gearwheel meshing with the first gearwheel and the fourth gearwheel meshing with the second gearwheel.

6. Apparatus according to claim 5, characterized in that the third and fourth gearwheels carried by the cage both have the same number of teeth as the first gearwheel and wherein this number of teeth is less than that of the second gearwheel.

7. Apparatus according to claim 6, characterized in that the numbers of teeth of the first and second gearwheels are respectively 30 and 31.

8. Apparatus according to claim 1, characterized in that means are provided for detecting the variations in the electric power supplied by the alternator independently of the alternator shaft speed $N_S$ and for making the auxiliary drive means sensitive to these power variations.

9. Apparatus according to claim 1, characterized in that said first rotary drive means comprises an electric motor having a rotor that is integral with the flywheel.

10. Apparatus according to claim 1, characterized in that the first rotary drive means comprises a slipping coupler and an electric motor having a rotor that is connected to the flywheel through said slipping coupler.

11. Apparatus according to claim 1, characterized in that the first rotary drive means is adapted to be powered by an electrical utility network.

12. An electrical alternator system as in claim 1 wherein said auxiliary drive means controls the variable transfer of additional mechanical energy to said second input so as to maintain the alternator shaft speed $N_S$ substantially equal to a desired reference speed $N_O$ by controlling the rotational speed $N_R$ input at said second input as a function of flywheel shaft speed $N_E$ so that $N_R$ is at a minimum value when $N_E$ is at a maximum value and vice versa.

* * * * *